United States Patent [19]

Fleming

[11] Patent Number: 4,651,936

[45] Date of Patent: Mar. 24, 1987

[54] CUTTING KNIFE BEVEL EXTENDER FOR FORAGE HARVESTERS

[75] Inventor: Philip F. Fleming, West Bend, Wis.

[73] Assignee: Gehl Company, West Bend, Wis.

[21] Appl. No.: 668,750

[22] Filed: Nov. 6, 1984

[51] Int. Cl.⁴ .............................................. B02C 13/28
[52] U.S. Cl. .................................... 241/222; 241/238;
   241/242; 241/286; 83/356.3; 144/176; 144/241
[58] Field of Search ................ 30/240; 83/356.3, 355,
   83/673, 674, 698, 700; 144/176, 241; 241/101.7,
   221, 222, 238, 240, 241, 242, 286, 292.1, 293

[56] References Cited

U.S. PATENT DOCUMENTS

| | | | |
|---|---|---|---|
| 1,515,377 | 11/1924 | White | 241/222 X |
| 3,863,403 | 2/1975 | Fleming | 56/249 |
| 3,874,605 | 4/1975 | Fleming | 241/292 |
| 4,033,518 | 7/1977 | Fleming et al. | 241/47 |
| 4,055,309 | 10/1977 | Fleming et al. | 241/221 |
| 4,478,030 | 10/1984 | Druais et al. | 241/220 X |

FOREIGN PATENT DOCUMENTS 2806311  8/1979  Fed. Rep. of Germany ...... 241/222

OTHER PUBLICATIONS

"Forage Harvester 1250" by Gehl Company.
"Forage Harvester 750" by Gehl Company.
"Forage Harvester 1000" by Gehl Company.
"CT 300 Forage Harvester", Service Parts Manual by Gehl.

*Primary Examiner*—Mark Rosenbaum
*Assistant Examiner*—Timothy V. Eley
*Attorney, Agent, or Firm*—Andrus, Sceales, Starke & Sawall

[57] ABSTRACT

A device for use with a rotating cutting knife of a forage harvester to prevent the production of long cobs. The device includes a support member mounted on each cutting knife having a bevelled front face positioned to engage a cob face and support the cob in its longitudinal dimension as a knife cuts the cob along its lateral dimension. The support member is adjustably mounted on the knife between an operative position wherein the bevelled face of the support member is in substantially colinear relationship with the bevelled face of the knife and an inoperative position wherein the bevelled face of the support member is spaced from the bevelled face of the cutting knife.

8 Claims, 8 Drawing Figures

CUTTING KNIFE BEVEL EXTENDER FOR FORAGE HARVESTERS

BACKGROUND OF THE INVENTION

The present invention relates to forage harvesters, and more particularly to a forage harvester incorporating means for preventing the production of long cobs.

Forage harvesters of the type herein concerned include a crop cutting cylinder having a plurality of circumferentially spaced cutting knives supported thereon and rotatable about a longitudinal axis, and an elongated stationary shear bar located adjacent the cutting knives of the cylinder in cutting cooperation therewith. One of the continuing problems with forage harvesters of this type has been the production of corn cobs chopped longer than the length of cut to which the machine is set. Cattle will reject these so-called "long cobs", especially if the grain has been removed. As a result, these long cobs lay in cattle feed bunks where they represent a waste of food energy and a nuisance to be cleaned up after each feeding.

Long cobs are typically produced when the bending couple imposed by a cylinder knife as it cuts laterally into a cob, cracks the cob one, two or three inches in front of the point of impact. This short section of cob is now no longer adequately supported by the machine or by the matrix of corn stalks in which it is embedded, and consequently it is frequently flipped into the cutting cylinder without further reduction in length.

One method successfully used to reduce the intensity of this problem is to grind the cutting edges of the cylinder knives to a bevel which so nearly matches the cutting arc of the knife that it imposes a resisting couple against the face of a cob being cut to balance the cutting forces thereby preventing the flipping action. This method, however, has not been totally satisfactory and there remains a need for an improved mechanism for preventing the production of long cobs.

SUMMARY OF THE INVENTION

A bevel extender for use with a crop cutting knife on a rotating chopping cylinder of a forage harvester to prevent the production of long cobs. The bevel extender includes a support member having an abutment surface positioned to engage a cob face and support the cob in its longitudinal dimension as a cutting knife cuts the cob along its lateral dimension, and means for mounting the support member on the knife.

The device is mounted adjacent the trailing edge of a cylinder knife, and its abutment surface is bevelled to match the bevel of the cutting edge of the cylinder knife. The bevelled face of the support member is located in a substantially colinear relationship with the bevelled face of the cylinder knife along any plane perpendicular to the axis of the chopping cylinder during operation.

The mounting means includes means for adjustably mounting the support member into and out of its colinear relationship with the cylinder knife so that in its operative position the bevelled face of the support member is aligned with the bevelled face of a cutting knife, and in its inoperative position the bevelled face of the support member is laterally offset or spaced from the bevelled face of the cutting knife. This latter position enables the cutting edge of a cylinder knife to be periodically sharpened without any interference by the support member.

The adjustable mounting means includes a plurality of spaced apart, parallel slots formed in the cylinder knife, and a corresponding plurality of bolt means extending through the support member and in alignment with these slots.

BRIEF DESCRIPTION OF THE DRAWINGS

The drawings illustrate the best mode presently contemplated of carrying out the invention.

In the drawings.

DESCRIPTION OF THE PREFERRED EMBODIMENT

Figure 1:
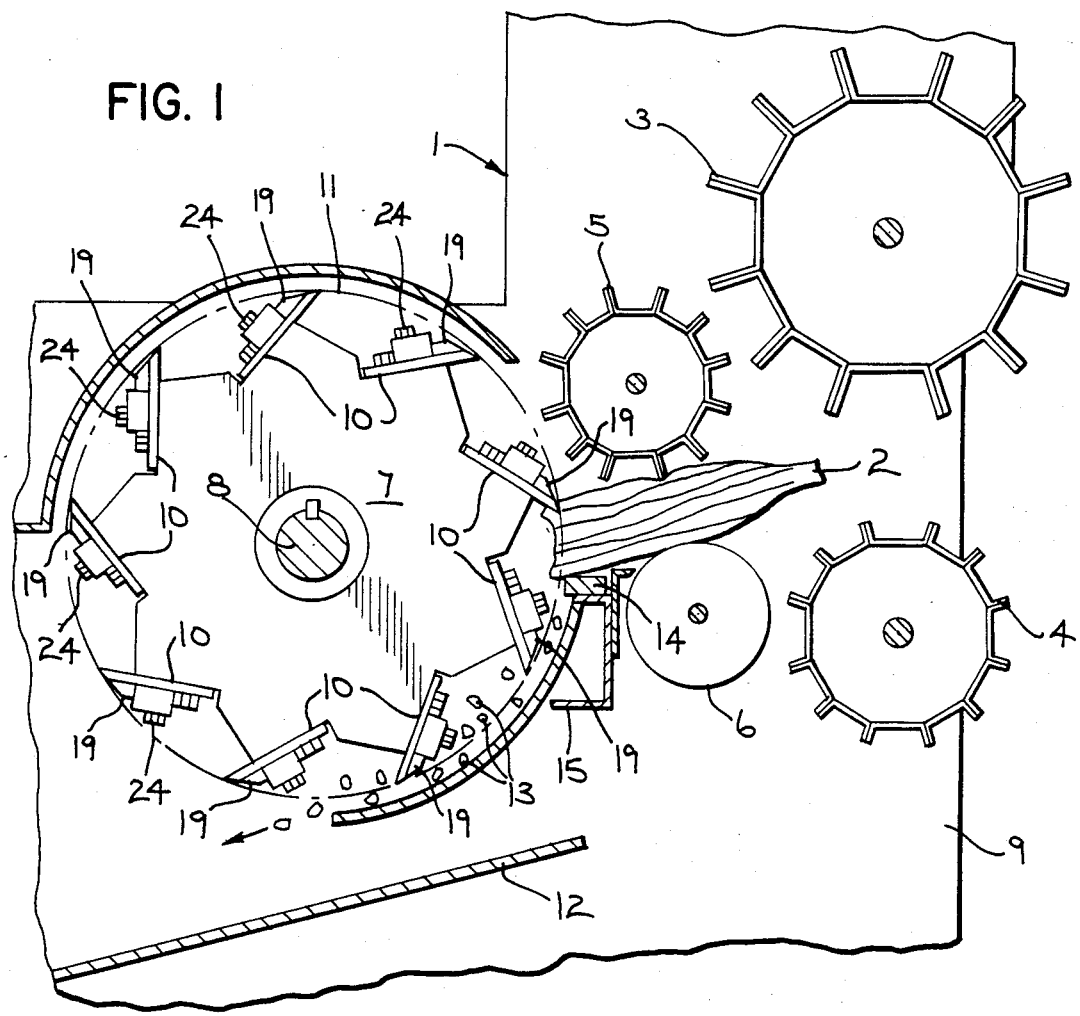
FIG. 1 is a side view in elevation of a portion of a forage harvester illustrating cylinder knives incorporating bevel extenders in accordance with the present invention.

Referring now to the drawings, FIG. 1 illustrates a portion of a forage harvester which embodies the present invention. The forage harvester includes a main frame 1 mounted on ground engaging wheels (not shown) which is adapted to be towed by a tractor or the like. Frame 1 also functions to support a head attachment for delivering crop such as corn cobs 2 in a well-known manner to a conventional assembly of upper and lower feed rollers 3 and 4 which in turn deliver the crop to a pair of conventional compactor rollers 5 and 6. A rotating chopping or cutting cylinder 7 is mounted on a shaft 8 which extends between a pair of vertical side walls 9 (only one of which is shown) of main frame 1 for rotation about its longitudinal axis. Cylinder 7 is illustrated as including a plurality of circumferentially spaced conventional cutting knives 10 which, when cylinder 7 is rotating, defines an imaginary cylindrical surface 11. A blower assembly (not shown) including a feed chute 12 is located at the rear of the forage harvester and acts to receive cut crop material 13 which is cut by cylinder 7 and thrown rearwardly into the blower assembly. The blower assembly in turn blows the cut crop material 13 into a forage wagon or the like which is also being towed by the tractor.

A cutter bar or shear bar 14 is positioned immediately forward of cutting cylinder 7 in closely adjacent relationship thereto for cutting cooperation therewith. Cylinder knives 10 may thus function in combination with shear bar 14 to cut crop material fed to cylinder 7 by rollers 3–6. Shear bar 14 extends laterally between side walls 9 of frame 1 parallel to the longitudinal axis of shaft 8. Shear bar 14 is supported by an upper flange of a laterally extending cutter bar support channel 15 which is rigidly supported at its opposite ends by the vertical side walls 9. Shear bar 14 is movable in a generally horizontal plane toward and away from cylinder 7 so that the gap formed between knives 10 and bar 14 can be adjusted to compensate for wear of knives 10, and to facilitate accurate alignment of shear bar 14.

Figure 2:
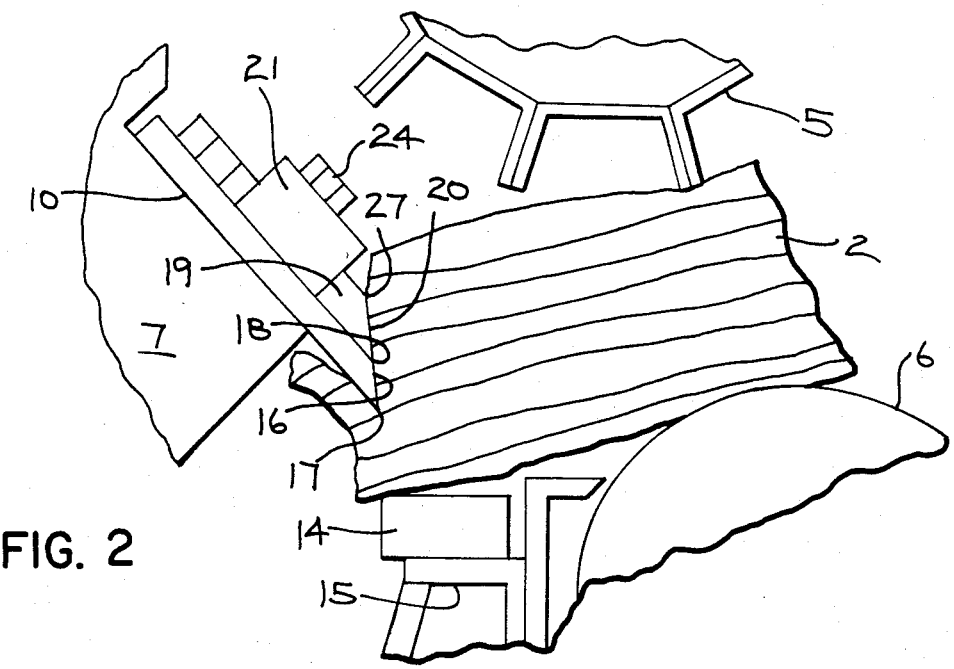
FIG. 2 is an enlarged fragmentary detailed side view of a cylinder knife and bevel extender cutting laterally through a corn cob.

As illustrated best in FIGS. 3-6, each cylinder knife 10 is in the form of a thin flat plate about ⅜" thick and twisted to a helix of about 2° per linear inch over a length of about 21 inches. The forward portion of each knife 10 includes a bevelled face or land 16 that defines a leading edge 17 along its bottom surface which is the cutting edge of knife 10 and a trailing edge 18 along its top surface. Face 16 is bevelled to between about 40° to about 45° so that as knives 10 rotate faces 16 nearly match the cutting arc defined by cylindrical surface 11, as shown best in FIG. 2.

Figure 3:
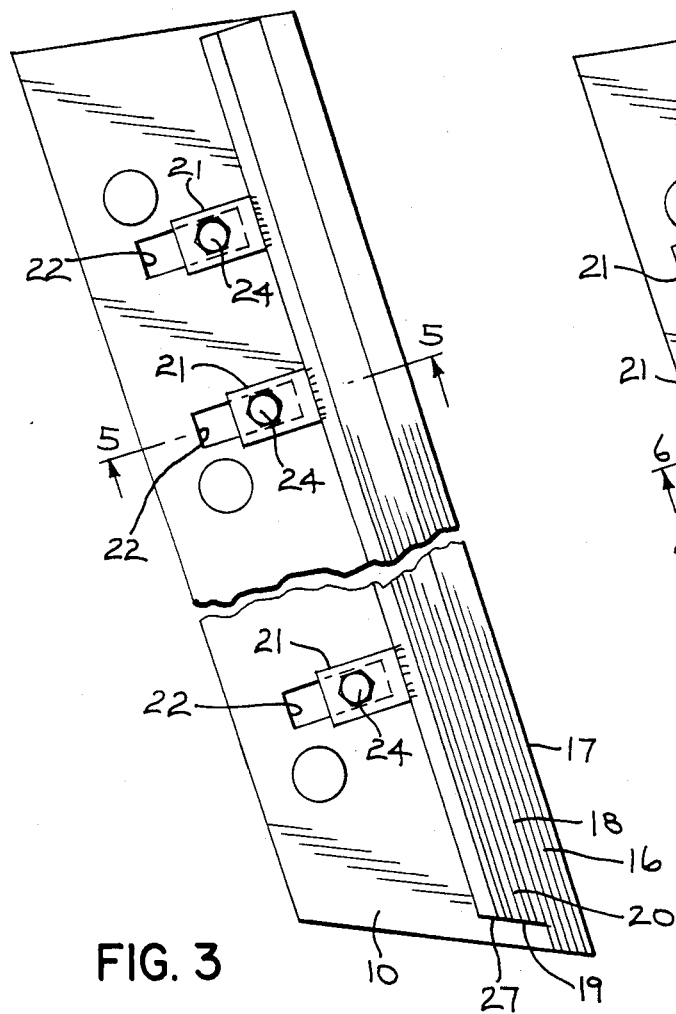
FIG. 3 is a top plan view of cylinder knife and bevel extender illustrating the bevel extender in its operative position.
Figure 4:
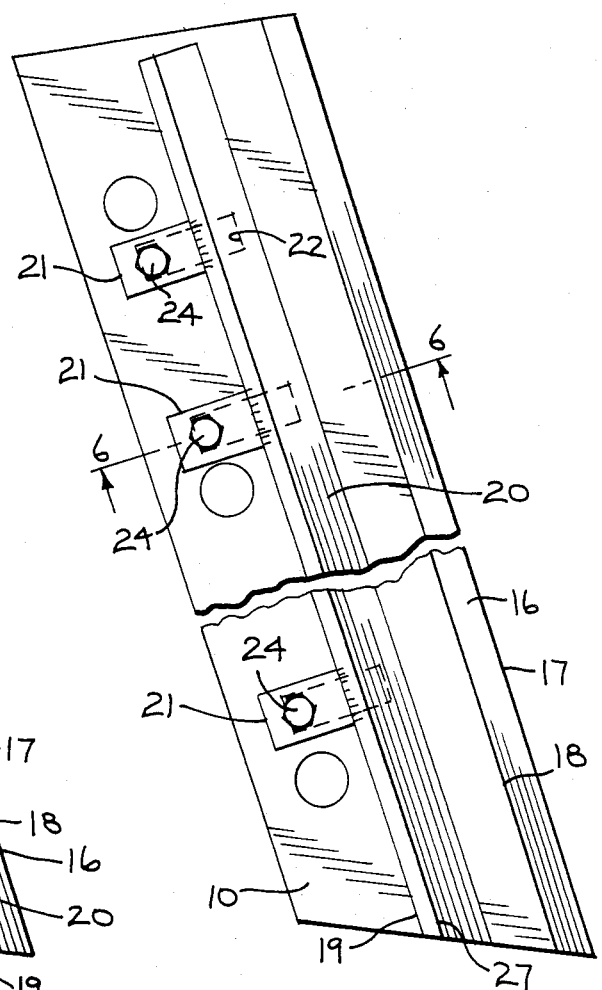
FIG. 4 is a top plan view similar to FIG. 3 illustrating the bevel extender in its retracted inoperative position.

As a means for preventing the production of long cobs, the forage harvester includes a bevel extender having a support member 19 on each knife 10. Each support member 19 is identical and therefore only one need hereinafter be described. Support member 19 is in the form of an enlongate bar twisted to a helix which matches the helical form of knives 10 and extending across substantially the entire length of a knife 10, as shown in FIGS. 3 and 4. As shown best in FIGS. 5 and 6, support member 19 has a cross section in the form of a trapezoid and includes an abutment surface or bevelled front face 20 which is tapered to match the taper of the bevelled face 16 of knife 10. Support member 19 is about ⅜" thick and thus face 20 more than doubles the effective length of face 16 of knife 10.

Figure 5:
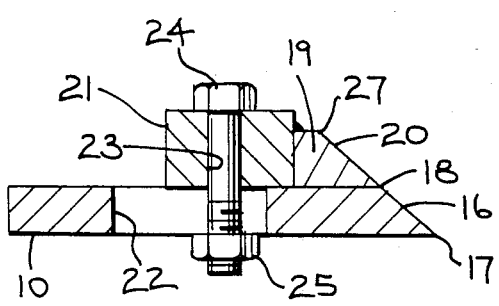
FIG. 5 is a cross sectional side view taken along the plane of the line 5—5 in FIG. 3.
Figure 6:
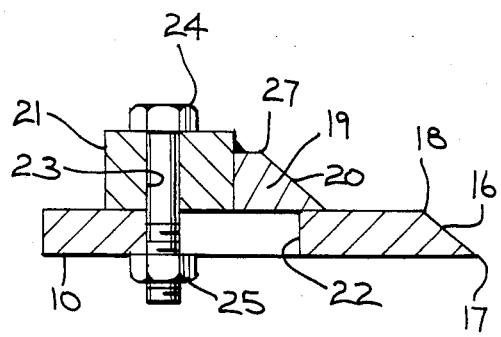
FIG. 6 is a cross sectional side view taken along the plane of the line 6—6 in FIG. 4.

As shown best in FIGS. 5 and 6, support member 19 is slidably mounted on the top surface of knife 10 for movement between an operative position wherein bevelled face 20 of support member 19 is located in alignment with bevelled face 16 of knife 10 (FIG. 5), and an inoperative position wherein bevelled face 20 of support member 19 is laterally offset or spaced from bevelled face 16 of knife 10 (FIG. 6). In its aligned operative position, bevelled face 20 is located in a substantially colinear relationship with bevelled face 16 of knife 10 along any plane perpendicular to the rotational axis of cylinder 7. In order to accomplish this adjustable mounting, support member 19 includes three spaced apart support blocks 21 attached to its rear surface opposite face 20, and knife 10 includes three elongate slots 22 formed therethrough and in alignment with blocks 21. Each block 21 includes a bore 23 formed therethrough for receiving a bolt 24 which extends therethrough and through slot 22. A nut 25 is used to securely attach support member 19 in any desired position along slot 22. Thus, for example, support member 19 may be moved to its operative position as shown in FIG. 5 or to its inoperative position as shown in FIG. 6 by merely loosening nut 25, sliding support member 19 along the top surface of knife 10, and retightening nut 25. The position for support member 19 shown in FIG. 6 is desireable in order to permit the sharpening of cutting edge 17 in any conventional manner without interference by support member 19.

Figure 7:
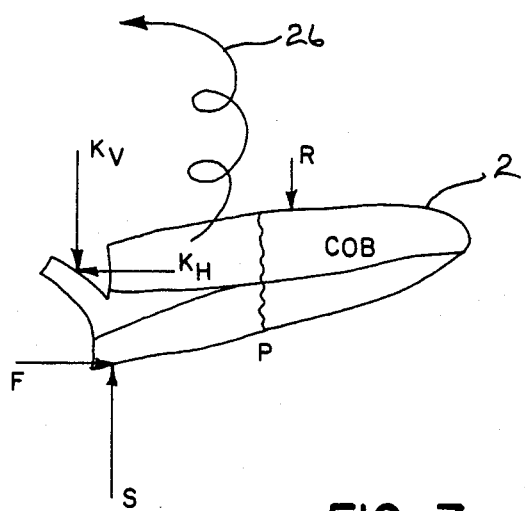
FIG. 7 is a schematic view illustrating the forces imposed on a corn cob being cut by a conventional prior art cylinder knife.
Figure 8:
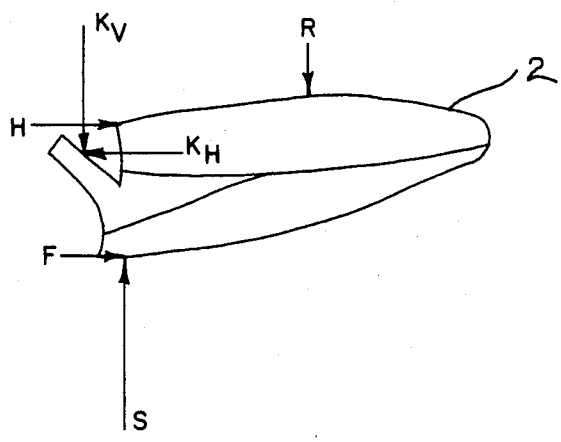
FIG. 8 is a schematic view illustrating the forces imposed on a corn cob being cut by a cylinder knife incorporating a bevel extender in accordance with the present invention.

Referring now to FIGS. 7 and 8, there is illustrated the forces imposed upon a corn cob 2 by the various components of a conventional forage harvester having knives 10 without support members 19. In contrast, FIG. 8 illustrates the forces imposed upon a corn cob 2 being cut by a knife 10 incorporating a support member 19. $K_V$ and $K_H$ represent, respectively, the vertical and horizontal components of the cutting force imposed by knife 10. S and R represent, respectively, the vertical forces of shear bar 14 and upper roller 5 that balance $K_V$. F represents the horizontal frictional force at shear bar 14 that resists the action of $K_H$.

Due to force couples $K_V$-S and $K_H$-F cob 2 has internal shear forces, most significantly between S and R, tending to break cob 2 at its weakest point, for example, at P. When broken, these same force couples tend to spin the cob remnant which is no longer held by the upper roller 5, and flip it over knife 10 and into the cutting chamber of cylinder 7, as indicated by helical arrow 26. When the cob remnant is flipped past shear bar 14 in this manner no further reduction in size is possible leaving what is called a "long cob" which will be rejected by cattle.

FIG. 8 illustrates cob 2 supported by a support member 19 bolted to the top of a cylinder knife 10 and illustrates new force H which represents the effect of bevelled face 20 on the face of cob 2. Due to the length of bevelled face 20 cob 2 is supported in its longitudinal dimension as knife 10 cuts cob 2 along its lateral dimension. It can be seen from FIG. 8 that force H provides a balance for the horizontal force couple $K_H$-F thereby materially reducing the internal stresses between S and R. Reduction of these stresses eliminates any tendency of cob 2 to break and spin over knive 10 and past shear bar 14. As shown best in FIG. 2, the point of support of cob 2 by a knife 10 without support member 19 is represented by trailing edge 18 whereas the point of support for cob 2 with support member 19 is represented by trailing edge 27. Edge 27 thus supports cob 2 in its longitudinal dimension when engaged therewith as knife 10 cuts cob 2 laterally to thereby prevent the production of "long cobs."

Various modes of carrying out the invention are contemplated as being within the scope of the following claims particularly pointing out and distinctly claiming the subject matter which is regarded as the invention.

I claim:

1. A device for use with a rotating cutting knive of a forage harvester to prevent the production of long cobs, comprising:

a support member including a flat, bevelled abutment surface positioned to engage and support a cob in its longitudinal dimension as a knife cuts said cob along its lateral dimension, said lateral dimension defining a cutting height for said cob; and means for mounting said support member on a knife having a flat, bevelled face so that said abutment surface is in a coplanar relationship with said knife face, said abutment surface having a height at least equal to the height of said knife face but less than the cutting height of a corn cob to be cut, said mounting means includes means for adjusting the position of said support member between an operative position wherein said abutment surface and knife face are in said coplanar relationship and an inoperative position wherein said abutment surface is spaced from said knife face.

2. The device of claim 1, wherein said adjusting means includes bolt means extending through said support member and located in alignment with a slot in a cutting knife for sliding cooperation therewith.

3. A forage harvester for cutting corn cobs and like crops, comprising:
a frame;
a crop cutting cylinder supported on said frame and rotatable about a longitudinal axis, said cutting cylinder includes at least one elongated cutting knife mounted on said cylinder for rotation therewith and extending parallel to said longitudinal axis said knife includes a leading edge defining a cutting edge and a trailing edge, and includes a bevelled face between said leading and trailing edges;
a support means on said knife for engaging and supporting a corn cob in its longitudinal dimension as said knife cuts said cob along its lateral dimension, said lateral dimension defining a cutting height for said cob, said support means includes a support member mounted adjacent said trailing edge, and said support member includes a bevelled face located in a coplanar relationship with the bevelled face of said knife, said bevelled support member face having a height at least equal to the height of said bevelled knife face but less than the cutting height of a corn cob to be cut; and
means for mounting said support means on said knife, said mounting means includes means for adjustably mounting said support member into and out of said coplanar relationship.

4. The forage harvester of claim 3, wherein said adjustable mounting means includes a slot formed in said knife, and bolt means extending through said support member and slot.

5. The forage harvester of claim 4, wherein said mounting means includes a plurality of spaced apart, parallel slots and a corresponding plurality of bolt means in alignment therewith.

6. A forage harvester for cutting crop material, comprising:
a frame;
a crop cutting cylinder supported on said frame and rotatable about a longitudinal axis for cutting crop material;
a plurality of circumferentially spaced elongated cutting knives mounted on said cylinder for rotation therewith, each of said cutting knives includes a flat bevelled face defining a leading cutting edge and a trailing edge extending parallel to said longitudinal axis;
knife mounting means for fixedly mounting said knives on said cylinder;
an elongated shear bar extending parallel to said longitudinal axis and positioned in closely adjacent relationship to said cutting knives whereby crop material may be cut between said cutting knives and said shear bar;
an elongated support member mounted on each of said cutting knives adjacent said trailing edge and extending parallel to said longitudinal axis, each of said support members includes a bevelled face disposed substantially parallel to the bevelled face of its corresponding cutting knive in a coplanar relationship therewith, so that in said coplanar relationship each of said support members engage and support a corn cob in its longitudinal dimension as said cutting knives cut said cob along its lateral dimension, said lateral dimension defining a cutting height for said cob, each of said bevelled support member faces having a height at least equal to the height of said bevelled knife faces but less than the cutting height of crop material to be cut; and
support member mounting means for adjustably mounting each of said support members on its corresponding cutting knife between an operative position wherein the bevelled face of said support member is located in said coplanar relationship with the bevelled face of the cutting knife and an inoperative position wherein the bevelled face of said support member is spaced from the bevelled face of the cutting knife.

7. The forage harvester of claim 6, wherein said adjustable mounting means includes a slot formed in said knife, and bolt means extending through said support member and slot.

8. The forage harvester of claim 7, wherein said adjustable support member mounting means includes a plurality of spaced apart, parallel slots and a corresponding plurality of bolt means in alignment therewith.

* * * * *